United States Patent Office 3,652,477
Patented Mar. 28, 1972

3,652,477
RESOLE VARNISH MIXTURE
George J. Anderson, Wilbraham, and Ronald H. Dahms, Springfield, Mass., assignors to Monsanto Company, St. Louis, Mo.
No Drawing. Filed July 25, 1968, Ser. No. 747,481
Int. Cl. C08g 37/08
U.S. Cl. 260—29.3
8 Claims

ABSTRACT OF THE DISCLOSURE

Phenolic varnishes having dissolved therein two different resole resins. These varnishes are suitable for use in the production of paper laminates having high electrical properties by using only a single pass preparation procedure.

BACKGROUND

Phenolic varnishes are used to make so-called electrical grade paper laminates having excellent electrical properties together with acceptably high values for flexural strength, water absorption and other properties associated with a finish laminate. To make such paper laminates, the art employs characteristically a paper of high purity (that is, one relatively free from ionic materials capable of conducting an electric current).

Heretofore, when impregnating such a paper with phenolic varnish to make an electrical grade laminate, the art has generally employed a two-pass phenolic resin system by which reference is had to be the fact that such paper is first impregnated with a low molecular weight, generally unmodified resole resin (typically using a resole resin varnish or aqueous solution which is applied to such paper by spraying, dipping, or the like). Following this first impregnating or coating operation, the residual solvent in the varnish is removed by evaporation, and the resulting paper is coated or impregnated a second time with a modified resole resin varnish. This second varnish contains a phenolic resin which when thermoset has better electrical properties than those associated with the first or unmodified resole resin (when it is thermoset). Such a two-pass system was generally heretofore necessary in order to obtain the desired excellent electric properties needed in an electrical grade paper laminate made with phenolic resin varnishes.

Although the art has attempted heretofore to produce a phenolic resin varnish system which would enable one to impregnate paper to be used in electrical grade laminates in a single pass (as opposed to two passes as just described), such prior art efforts have not been particularly successful.

There has now been surprisingly discovered a phenolic varnish system which can be used in a one-pass impregnation step to produce paper laminates having relatively high electrical properties as well as acceptably high flexural strength and water absorption properties. Furthermore, this novel phenolic varnish system is storage stable and contains characteristically an extremely high percentage of total solids relative to amounts of phenol used as starting material so that such a varnish is capable of depositing on and in a sheet of paper surprisingly high percentages of total solids. These novel phenolic varnishes comprise an organic liquid having dissolved therein two widely differing (as respects structure and properties) resole resins. One of these resins is a low molecular weight base catalyzed condensation product of phenol and formaldehyde, the other is a relatively high molecular weight base catalyzed condensation product of a certain substituted phenol mixture and formaldehyde. As respects capacity to product electrical grade paper laminates through a single pass impregnation procedure, the phenolic varnish system of the present invention can be considered to comprise an unexpected synergistic mixture of two different but compatible phenolic resins.

SUMMARY

This invention is directed to new and very useful solutions of resole resins in organic solvents. The solutions are especially adapted for use in the manufacture of so-called electrical grade paper laminates having high flexural strength, low water absorption, and excellent electrical properties. The organic solutions of this invention comprises:

(A) From about 20 to 75 weight percent of a dissolved mixture of a first phenolic resin and second phenolic resin, (B) From about 0.5 to 15 weight percent of dissolved water, and (C) The balance up to 100 weight percent of any given soloution being an organic liquid which:

(1) is substantially inert (as respects such resin mixture),
(2) evaporates below about 150° C. at atmospheric pressures,
(3) is a mutual solvent for such resin mixtures and for said water (if present).

The weight ratio of said first phenolic resin to said second phenolic resin in such mixture ranges from about 1:2 to 1:20 (dry weight basis).

The first phenolic resin is a resole resin. It has a formaldehyde to phenol mol ratio of from about 0.9 to 2.5 and is produced by reacting under aqueous liquid phase conditions phenol with formaldehyde in the presence of an organic basic catalyst. It has a low molecular weight as by the fact that this resin is water soluble as shown by the fact that 55 weight percent aqueous solution thereof can be prepared. This solution characteristically has a water dilutability of at least about 1:1, and preferably of at least about 8:1. In addition, this resin has a free formaldehyde content which is less than about 5 weight percent. Preferably, the formaldehyde to phenol mole ratio in his resin ranges from about 1½ to 2. An organic basic catalyst is used in preparation as indicated so as to produce a resole resin product which will not contain free ions which might conduct an electrical charge after the resin has been thermoset. Suitable organic base catalysts are well known to the art; examples include triethylamine, hexamethylenetetramine, and the like.

The second resole resin employed in the products of this invention is a substituted phenol-formaldehyde resole resin and has a formaldehyde to phenol mol ratio of from about 0.8 to 2.0 (preferably from about 0.9 to 1.5), and is produced by reacting in the presence of a basic (preferably organic) catalyst under liquid aqueous phase conditions a certain substituted phenol mixture with formaldehyde. This second resole resin further has a relatively high molecular weight as shown by the fact that it is substantially water insoluble but has a methanol solubility such that a 60 weight percent solution thereof can be prepared in methanol. Such methanol solution characteristically has a viscosity not greater than about 5000 centipoises, and preferably in the range from about 50 to 500 centipoises. In addition, this resin has a free formaldehyde content which is less than about 5 weight percent.

It will be appreciated that the aldehyde to phenol ratios herein described have reference to the total amount of phenol present before a reaction, including the phenol which is substituted.

The substituted phenol mixture used to make such resin is itself prepared by initially reacting phenol under Friedel-Crafts conditions with a mixture of cyclopentadiene codimers which comprises (when in a form substantially free of other materials wherein the sum of all component compounds of any given such mixture equals substantially 100 weight percent):

(A) From about 50 to 99 weight percent of compounds each molecule of which has:

(1) the dicyclopentadiene nucleus
(2) from 10 through 13 carbon atoms
(3) as nuclear substituents from 0 through 3 methyl groups, and (B) From about 1 to 50 weight percent of compounds each molecule of which is a codimer of cyclopentadiene with at least one acyclic conjugated alkadiene having from 4 through 6 carbon atoms per molecule.

In a preferred such mixture, a minor amount of cyclic and/or acyclic conjugated alkadiene is present, typically less than about 15 weight percent (same basis) and having 5 or 6 carbon atoms per molecule. Thus, such a mixture can comprise:

(A) From about 70 to 90 weight percent of dicyclopentadiene, (B) From about 10 to 30 weight percent of compounds each molecule of which is a codimer of cyclopentadiene with at least one acyclic conjugated alkadiene having from 4 through 6 carbon atoms per molecule, and (C) From about 2 to 15 weight percent of compounds each molecule of which is a cyclic and/or an acyclic conjugated alkadiene having 5 or 6 carbon atoms per molecule.

In another preferred such mixture, both a minor amount (less than about 10 weight percent—same basis) of compounds containing the indene nucleus, and a minor amount (less than about 15 weight percent—same basis) of compounds containing the phenyl vinylidene structure are present. Thus, such a mixture can comprise:

(A) From about 1.5 to 10 weight percent of compounds each molecule of which has:

(1) the indene nucleus
(2) from 9 through 13 carbon atoms
(3) as nuclear substituents from 0 through 4 methyl groups (B) From about 50 to 85 weight percent of compounds each molecule of which has:

(1) the dicyclopentadiene nucleus
(2) from about 10 through 13 carbon atoms
(3) as nuclear substituents from 0 through 3 methyl groups, (C) From about 4 to 10 weight percent of compounds each molecule of which is a codimer of cyclopentadiene with at least one acyclic conjugated alkadiene having from 4 through 6 carbon atoms per molecule, and (D) From about 4 to 15 weight percent of compounds each molecule of which has:

(1) a phenyl group substituted by a vinylidene group,
(2) from 8 through 13 carbon atoms,
(3) as substituents from 0 through 3 groups selected from the class consisting of methyl and ethyl.

In still another preferred such mixture, there are controlled minor amounts (from about 1 to 4 weight percent—same basis) of each of methylcyclopentadiene and codimers of cyclopentadiene with acyclic conjugated alkadienes relative to a major amount (from about 92 to 96 weight percent—same basis) of dicyclopentadiene. Thus, such a mixture can comprise:

(A) From about 92 to 97 weight percent of dicyclopentadiene, (B) From about 1 to 5 weight percent of compounds each molecule of which is a codimer of cyclopentadiene with at least one acyclic conjugated alkadiene having from 4 through 6 carbon atoms per molecule, and (C) From about 1 to 4 weight percent of compounds each molecule of which is a codimer of cyclopentadiene with a methylcyclopentadiene, provided that the sum of (A) and (C) in any given such cyclopentadiene dimer mixture is always at least about 95 weight percent, and preferably about 97 weight percent, thereof (same basis).

Preferably, such a mixture contains at least about 3 weight percent (same basis) of (B).

Examples of suitable such acyclic conjugated alkadienes (whether or not dimerized as specified above) include butadiene (a four carbon molecule used as specified above), piperylene, isoprene, 1,3-hexadiene, 1-methyl-1,3-pentadiene, and the like.

At the time when such a mixture is reacted with phenol as indicated, there can be present as diluents inert (e.g. as respects reactivity towards components of such mixture and phenol under Friedel-Crafts reaction conditions) organic compounds, such as aromatic and aliphatic hydrocarbons. While there is no apparent upper limit on the amount of diluent which may be present, it is preferred that the amount of diluent present range from about 5 to 50 weight percent (same basis).

By the phrase "when in a form substantially free of other materials" reference is had to a mixture (e.g. of starting materials, of product, or the like, as the case may be) which is substantially free (e.g. on an analytical or theoretical basis) of substances (like inerts as respects reactivity with phenol under Friedel-Crafts catalysis) other than such mixture itself. For example, the aforeindicated starting mixture of diene codimers could have an inert hydrocarbon diluent admixed therewith, such as benzene, lower alkyl substituted benzenes, naphthalenes and alkane hydrocarbons containing from 6 through 10 carbon atoms per molecule.

The term "cyclopentadiene" as used herein refers to the cyclic compound having the structure:

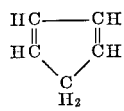

The term "dicyclopentadiene" as used herein refers to the cyclic compound having the structure:

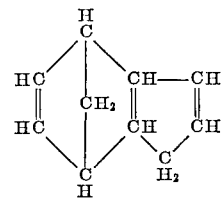

The term "vinylidene" as used herein has generic reference both to vinylidene radicals ($CH_2=C<$), and vinyl radicals ($CH_2=CH$ or $-CH=CH-$); observe that in carbocyclic compound mixtures used in this invention having a phenyl group substituted by a vinylidene group, alpha-methyl substitution is included in this definition, as well as styrene, methyl styrene, and ethyl styrene.

All solids herein are conveniently measured using ASTM Test Procedure No. D-115-55.

Such a starting material diene codimer compound mixture can be prepared synthetically or derived by suitable preparative procedures from naturally occurring crude petroleum, as those skilled in the art with appreciate. A preferred mixture of such diene codimer compounds for use in this invention is a petroleum derived blend of components having diluents already incorporated thereinto. For example, suitable such mixtures are shown in the following Tables I–III. In Table I is shown an example of such a mixture available commercially under the trade designation "Dicyclopentadiene Concentrate" from the Monsanto Company, St. Louis, Mo.; in Table II, one available commercially under the trade designation "Resin Former P" from Mess Oil and Chemical Co. of New York, N.Y. and in Table III, one available commercially under the trade designation "Dicyclopentadiene" from Union Carbide Company, New York, N.Y., and also one available commercially under the trade designation "Dicyclopentadiene" from Eastman Kodak Company, Rochester, N.Y.

TABLE I

| Component [1] | Total est., wt. percent [2] | Adjusted rel. approx. wt.[3] |
|---|---|---|
| A. Dicyclopentadiene compounds: | | |
| 1. Dicyclopentadiene | 72.1 | 77.1 |
| 2. Codimers of cyclopentadiene and methylcyclopentadiene | 0.4 | 0.4 |
| B. Cyclopentadiene/alkadiene codimers: (codimers of cyclopentadiene and acyclic conjugated alkadienes containing from 4 through 6 carbon atoms per molecule) [4] | 18.6 | 19.8 |
| C. Conjugated alkadienes: (cyclic and acyclic conjugated alkadienes containing 5 and 6 carbon atoms per molecule) [5] | 2.2 | 2.3 |
| D. Alkenes: 1. Cyclopentene | 0.4 | 0.4 |
| Total of (A), (B), (C), and (D) | 93.7 | 100.0 |
| E. Inerthydroxarbon diluents (total) | 6.3 | |
| 1. Benzene | 0.9 | |
| 2. Methylpentane, methylcyclopentane, and hexane | 5.4 | |

[1] Data in Table I derived from vapor-liquid-phase chromatography and mass spectrography.
[2] Based on total weight of diene dimer compounds and other components including diluents.
[3] Diene codimer compound mixture when in a form substantially free of other materials wherein the sum of all component compounds in any given such mixture equals substantially 100 weight percent.
[4] These alkadienes are usually piperylene and isoprene; composition of such alkadienes is somewhat variable.
[5] These alkadienes are usually piperylene, isoprene and cyclopentadiene; composition of such alkadienes is somewhat variable.

TABLE II

| Component | Total weight, percent basis [1] | Weigh tpercent diene codimer mixture components only [2] |
|---|---|---|
| Arylcycloalkenes | 1.7 | 1.9 |
| Indene | 1.7 | 1.9 |
| Dicyclopentadienes | 65.5 | 74.1 |
| Dicyclopentadiene | 48.9 | 55.3 |
| Methyldicyclopentadiene | 15.2 | 17.2 |
| Dimethyldicyclopentadiene | 1.4 | 1.6 |
| Cyclopentadiene/alkadiene codimers | 8.0 | 9.1 |
| Codimers of cyclopentadiene with acyclic conjugated alkadienes having from 4 through 6 carbon atoms per molecule: | | |
| Codimer with butadiene | 6.0 | 6.8 |
| Codimer with isoprene | 2.0 | 2.3 |
| Arylalkenes | 6.9 | 7.7 |
| Styrene | 5.6 | 6.3 |
| Alphamethylstyrene | 1.3 | 1.4 |
| Trimers incorporating cyclopentadiene, methylcyclopentadiene or conjugated alkadienes having from 4 through 6 carbon atoms per molecule | 6.4 | 7.2 |
| Diene codimer mixture subtotal | 88.5 | 100.0 |
| Unidentified components | 2.1 | |
| Inert diluents | 9.4 | |
| Benzene | 0.1 | |
| Toluene | 3.7 | |
| Xylene and ethylbenzene | 5.1 | |
| Naphthalene | 0.5 | |

[1] These values derived using a combination of vapor lipuid phase chromatography and mass spectrometry.
[2] When in a form substantially free of other materials wherein the sum of all component compounds of any given such mixture equals substantially 100 weight percent.

TABLE III

| | Weight percent [1] | |
|---|---|---|
| Component | Carbide | Eastman |
| Dicyclopentadienes | 93.2 | 95.6 |
| Methyldicyclopentadienes | 3.0 | 0.9 |
| Cyclopentadiene/acyclic conjugated diene codimers | 2.5 | 1.9 |
| Heavy ends [2] | 0.2 | 0.6 |
| Unidentified | 1.1 | 1.0 |

[1] These values derived using a combination of vapor liquid phase chromatography and mass spectrometry.
[2] Heavy ends here comprixe primarily trimers of such componenets as cyclopentadiene, methylcyclopentadiene, and conjugated alkadienes containing from 4 through 6 carbon atoms per molecule. Typically, these heavy ends are reactive with pehnol under Friedel-Crafts conditions as taught herein.

To react phenol with such an aforedescribed cyclopentadiene codimer mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent catalyst in the presence of appropriate heat and pressure. Conveniently, the phenol and suitable Friedel-Crafts acid catalyst are mixed, brought to the proper temperature and the diene codimer compound mixture metered into the acidified (or catalyzed) phenol.

For purposes of this invention, the reaction of diene codimer compound mixture with phenol is preferably carried out at temperatures in the range of from about 25 to 200° C., although higher and lower temperatures can be used. Also, the reaction is preferably conducted under liquid phase conditions at or below atmospheric pressures although superatmospheric pressures can be used. Inert hydrocarbons, as indicated above, generally facilitates the process. Such inert hydrocarbons can be readily removed, such as by vacuum stripping, at the completion of the reaction if desired. Especially when stripping is contemplated, the most preferred inert hydrocarbons having boiling points between about 70 and 140° C. The progress of the reaction can be monitored, if desired, by measuring the quantity remaining of unreacted diene codimer compound using, for example, vapor phase chromatography.

Friedel-Crafts catalysts which may be used in place of aluminum chloride, or together with aluminum chloride, include:

(A) other inorganic halides, such as gallium, titanium, antimony and zinc halides (including $Zn Cl_2$);
(B) inorganic acids, such as sulphuric, phosphoric and the hydrogen halides (including HF);
(C) activated clays, silica gel alumina, and the like;
(D) $BF_3$ and $BF_3$ organic complexes including complexes of $BF_3$ with organic compounds, such as ethanol, butanol, glycol, phenol, cresol, anisole, ethyl ether, isopropyl ether, di-n-butyl ether, formic acid, acetic acid, and propionic acid, or with inorganic acids, such as phosphoric acid, sulfuric acid, and the like; and
(E) alkyl, aryl and aralkyl sulfonic acids, such as ethanesulfonic acid benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, B-naphthalene sulfonic acid, 1-naphthol-4-sulfonic acid, and the like.

When $BF_3$, as such, is employed, it is conveniently fed to a reaction mixture in gaseous form. While any combination of diene codimer compound starting mixture, phenol and catalyst can be used, it is particularly convenient to react for each 100 parts by weight of phenol about 10 to 100 by weight parts of such diene codimer compound mixture (on a 100 weight percent basis in a form substantially free of other materials) in the presence of less than about 10 weight percent (based on the phenol) of acid catalyst.

The reaction mass is then heated to a temperature in the range of from about 25 to 200° C. The rate of this reaction is dependent, to some degree, on the temperature employed. In general, the reaction is rapid, and a complete reaction between phenol and diene codimer compound mixture is preferred. Suitable process variables are summarized in Table IV below.

TABLE IV

| Process variable | Broad range | Preferred range |
| --- | --- | --- |
| Temperature (° C.) | About 25 to 200° C. | About 70 to 125° C. |
| Reaction time | Less than about 4 hrs. | About 10 to 30 min. |
| Catalyst [1] | Less than about 10 weight percent. | About 0.1 to 1.0 weight percent. |
| Inert hydrocarbon [2] | Up to about 50 weight percent. | About 2 to 10 weight percent. |
| Total diene codimer compound mixture.[3,4] | About 10 to 100 parts by weight. | About 20 to 70 parts by weight. |

[1] Based on phenol.
[2] Content (based on total weight diene codimer compound mixture and diluent).
[3] Based on 100 parts by weight phenol.
[4] On a 100 weight percent basis in a form substantially free of other materials.

In general, to produce a second resole resin for use in this invention from a substituted phenol product prepared as just described, such product is neutralized under aqueous liquid phase conditions as by the addition of base, and then from about 0.8 to 2.0 moles of formaldehyde per one mole of (starting) phenol is mixed with the substituted phenol product (now itself a starting material). Also a basic catalyst material such as hexamethylenetetramine, ammonium hydroxide, triethylamine, sodium hydroxide, mixtures thereof, and the like, is introduced into the reaction mixture. The pH of this reaction mixture using such basic catalyst is maintained about 7.0.

It will be appreciated that the formaldehyde to phenol ratios herein described have reference to the total amount of phenol present before a reaction, including the phenol which is substituted by the diene codimer compound mixture, as described above. Aqueous liquid phase preparation conditions are generally but not necessarily used.

To optimize electrical properties in such resole products it is preferred to use as a basic catalyst, when reacting such substituted phenols with formaldehyde, one which is organic (substantially non-ionic) in character, such as triethylamine, or the like. Suitable process variables for making such resole are summarized in Table V below:

TABLE V

| Process variable | Broad range | Preferred range |
| --- | --- | --- |
| Formaldehyde/phenol, mol ratio. | About 0.8-2.0 | About 1.0-1.5. |
| Catalyst, parts by weight.[1] | About 0.1 -10 | About 0.5-4. |
| pH | Above about 7.0 | About 7.5-8.5. |
| Temperature | About 60° C. to reflux. | About 80° C. to reflux. |
| Reaction time | Under about 4 hours. | About 20-120 min. |

[1] Based on 100 parts by weight total phenol after neutralization of starting point.

The second resole product produced by reacting the substituted phenol with aldehyde as described above is one composed of methylolated substituted phenol which has been methylolated by the formaldehyde to a desired methylol content and optionally advanced (e.g. the molecular weight of the methylolated substituted phenol increased) as by heating as necessary or desirable to make a resole product having characteristics generally as described above. Such a resole can be regarded as being the reaction product of the above-described substituted phenol mixture and formaldehyde under aqueous base catalyzed conditions as described which product can be thermoset by heat alone without the use of a curing catalyst. In general, however, such resole product as made is a brown colored, unstable, multiphase aqueous emulsion whose viscosity depends, in any given instance, upon process and reactant variables but which usually ranges from a syrupy liquid to a semi-solid state. A resole product derived from such aqueous phase is a brown colored material whose viscosity varies from a syrup to a solid. Such emulsion is preferably dehydrated and formed into a varnish for use in making the impregnated sheet products of this invention.

Thus, when such emulsion is dehydrated under heat and reduced pressure to a water content generally under about 15 weight percent but over about 2 weight percent, there is produced a single-phased, clear, resole resin in the physical form usually of a high solids, viscous dark fluid. In any given instance, its total solids content, (residual) water content, and viscosity depend upon the amount of substituted phenol aldehyde product present, the mole ratio of aldehyde to substituted phenol, type and amount of methylolation catalyst, conditions and reactants used to substitute the phenol, methylolation temperature, degree of advancement, and the like.

When such a dehydrated liquid resole is further dehydrated to a water content under about 2 weight percent, there is produced a solid, so-called "one-stage lump resin" which consists substantially of pure resin. Usually the water content after such a dehydration is not less than about 0.5 weight percent of the product resin, in general.

Suitable resole dehydration conditions typically involve the use of a vacuum ranging from about 25 to 28 inches Hg and temperatures ranging from about 40 to 90° C. Higher and lower temperatures and pressures can be employed, as those skilled in the art appreciate.

To prepare a varnish from a dehydrated second resole product as described above, such resole is then conveniently dissolved in a relatively volatile, inert organic solvent medium having properties generally as defined above. It is not necessary, and it is preferred not, to prepare the resole resin in the form of a solid before dissolution thereof in organic solvent. In general, the water content of the partially dehydrated resole material is controlled so that the water content of the solution of resole resins in such solvent medium (the varnish) is below about 15 weight percent (based on total weight).

While the organic liquid used has properties as indicated above, it will be appreciated that such liquid can comprise mixtures of different organic liquids. Preferred liquids are lower alkanols (such as ethanol and methanol) and lower alkanones (such as acetone or methyl ethyl ketone). The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonone, octane, petroleum fractions, etc. Preferably, the total water content of a varnish of the invention is below about 10 weight percent, and more preferably falls in the range of from 0.5 to 5 weight percent.

Those skilled in the art will appreciate that care should preferably be taken when using this procedure to use an organic liquid system in which the phenolic resole resins are completely soluble as well as any water present. Adding, for example, a ketone or an ether-ester solvent like butyl Cellosolve generally improve the water tolerance (ability to dissolve water) of a solvent system.

The second resole varnishes thus made typically comprise:

(A) From about 20 to 75 weight percent of the above-described substituted phenol-formaldehyde resole resin, (B) From about 0.5 to 15 weight percent of dissolved water, (C) The balance up to 100 weight percent of any given varnish being an organic liquid which:

(1) is substantially inert (as respects such resin mixture).
(2) boils (evaporates) below about 150° C. at atmospheric pressures,
(3) is a mutual solvent for such resin and for such water (if present).

These varnishes are characteristically dark colored, one-phase, clear liquid solutions having a viscosity ranging from about 5 to 5000 centipoises, the exact viscosity of a given varnish depending upon chemical process and product variables used in manufacture. For impregnating applications, viscosities of from about 50 to 500 centipoises are preferred.

The total solids content of a given varnish product can be as high as about 85 weight percent or even higher and as low as about 20 weight percent or even lower, but preferred solids contents usually fall in the range of from about 25 to 65 weight percent.

The organic solutions of this invention have the first and second resins each dissolved therein as a physical mixture. The weight ratio of the first phenolic resin to the second is as indicated above.

A convenient preparation technique involves simply adding the first phenolic resin (as prepared in aqueous solution) to a previously prepared varnish (as described above) of the second phenolic resin. Those skilled in the art will appreciate that care must be taken when using this procedure to use an organic solvent liquid system in which both phenolic resins are soluble as well as water. Adding, for example, a ketone or an ether solvent like butyl Cellosolve improves the water tolerance (ability to dissolve water) of a solvent system.

The total phenolic resin solids content of a solution of this invention can vary over a wide range, as indicated, but the exact content for a given use situation is conveniently controlled by the conditions and equipment employed for application. To control water content of a product, the first phenolic resin is either dehydrated optionally using vacuum and elevated temperatures (e.g. 50° C. and 28″ Hg) or left in water, provided that the admixture of the two different resins results in a system containing from about 0.5 to 15 weight percent water.

These product compositions of this invention are characteristically dark colored, one-phase, clear liquids (or varnishes) having a viscosity ranging from about 50–5000 centipoises, the viscosity of a given such varnish depending upon chemical process and product variables. For impregnating applications, viscosities of from about 50 to 500 centipoises are usual. The total solids content of such a varnish can be as high as 85 weight percent or even higher, and as low as 20 weight percent and even lower, but preferred solids content of a concentrated varnish typically ranges from about 25 to 65 weight percent. As those skilled in the art will appreciate, the varnishes of this invention can be advanced to a greater extent without forming precipitates from the organic solvent phase than is the case of aqueous resole products of this invention.

When used for impregnation and reinforcing purposes, the liquid resole resins and the varnishes of this invention find use in cellulosic paper, asbestos paper, fabrics (cotton, glass fibers, nylon, etc.), etc. impregnation can be accomplished by any convenient means including dipping, coating, spraying, mixing, or the like. The so-impregnated material is dried to lower the volatiles content and then heated to advance the resin to the proper degree for the intended use.

In particular, the resole varnishes of this invention are useful in the preparation of paper laminates. Such laminates are used in electrical applications as supports or as insulation for conductive elements. The laminates are generally provided in sheet or block form which are then punched or otherwise machined to provide the desired configurations.

Thus, a varnish of the present invention can be used to impregnate a pre-formed sheet-like structure, organic or inorganic in composition and thereafter dried sufficiently to remove the volatile inerts therefrom. Similarly, the varnishes of the present invention can be used to make laminates composed of a plurality of pre-formed adjacent sheet-like structures being bonded to one another by means of a cured resin derived from the product varnish of the present invention.

In a preferred embodiment of the present invention, an organic solution contains from about 55 to 65 weight percent (total solution basis) of a dissolved mixture of first phenolic resin and second phenolic resin. In such a preferred solution, there are from about 6 to 12 parts of dissolved water (total solution basis). Also in such a preferred embodiment, the weight ratio of first phenolic resin to second phenolic resin ranges from about 1:4 to 1:8 (dry mixture weight basis). In this invention, all solids are conveniently measured using the ASTM Test Procedure D–115–55.

Also in such a preferred embodiment, the substituted phenol used in making the second phenolic resin is made using a preferred starting carbocyclic compound mixture in which there are from about 20 through 40 weight percent of compounds having the indene nucleus (as above described), from about 15 through 30 weight percent of compounds having the dicyclopentadiene nucleus (as above described) and from about 30 through 65 weight percent of compounds having a phenyl group and a vinylidene group as above described, the percentage of divinyl benzene in such preferred carbocyclic compound mixture being as described above. In any such preferred carbocyclic compound mixture, there are a total of 100 weight percent of these three components.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

The following examples illustrate second compositions for use in this invention. Each such composition contains a second phenolic resole resin characterized by:

(1) Having an aldehyde to (theoretical) phenol ratio of from about 0.8 to 2.0, (2) Being produced by reacting under aqueous liquid phase conditions formaldehyde and a substituted phenol mixture in the presence of an organic basic catalyst, (3) Being substantially insoluble in water but having a viscosity in methanol solution at 60 weight percent solids concentration of not greater than about 5000 centipoises, and (4) Having a free formaldehyde content which is less than about 5 weight percent.

Example A 100 parts of phenol and 1 part of concentrated sulphuric acid as an acid catalyst are changed to a suitable reaction vessel and heated to 125° C. 25 parts of a diene codimer mixture available commercially from the Monsanto Company under the trade designation "Dicyclopentadiene Concentrate" and having a composition shown in Table I is added to the starting mixture while keeping the temperature stable at 125° C. after addition of the diene codimer mixture for 1 hour and then to this resulting mixture is added 2 parts hexamethylenetetramine, 2 parts of triethylamine and 60 parts of 50 percent Formalin (50–50 formaldehyde-water). Now this reaction mixture is heated to a reflux at 100° C. and is refluxed thusly for 1 hour. Then the reaction mixture is cooled and volatile materials are removed under a vacuum or 28 inches of mercury until the temperature of the mixture rises to 80° C. Then 50 parts of methanol and 10 parts of acetone are added to the resin product to form a clear solution which thermally crosslinks to a clear film.

Examples B–M

The following examples are presented in tabular form for brevity. The process in all instances is as in Example A except that the indicated variables are altered as shown in Table VI below in each respective instance.

11

The numbers listed under "Type Catalyst" in Table VI designate specific Friedel-Crafts catalysts as follows:

1—$H_2SO_4$

2—$BF_3$.diethyl ether

The numbers listed under "Diene Codimer Mixture" in Table VI refer to specific mixtures as follows:

A—Monsanto's "Dicyclopentadiene Concentrate" having a composition as found in Table I.
B—Hess Oil and Chemical's "Resin Former P" having a composition as found in Table II.
C—Eastman Kodak's "Dicyclopentadiene" having a composition as found in Table III.
D—A synthetic mixture of 80 weight percent dicyclopentadiene and 20 weight percent cyclopentadiene-butadiene codimer.

TABLE VI

| Ex. No. | Phenol | Catalyst Type | Catalyst Amount | Diene codimer mixture Type | Diene codimer mixture Amount | Reaction temp., °C. | Post reaction time, minutes |
|---|---|---|---|---|---|---|---|
| B | 100 | 1 | 0.3 | A | 25 | 125 | 15 |
| C | 100 | 1 | 1.0 | B | 25 | 125 | 15 |
| D | 100 | 1 | 1.0 | C | 25 | 125 | 15 |
| E | 100 | 1 | 1.0 | D | 25 | 125 | 15 |
| F | 100 | 1 | 1.0 | A | 50 | 160 | 45 |
| G | 100 | 1 | 1.0 | B | 50 | 160 | 45 |
| H | 100 | 1 | 1.0 | C | 50 | 160 | 45 |
| I | 100 | 1 | 1.0 | D | 50 | 160 | 45 |
| J | 100 | 2 | 0.1 | A | 25 | 75 | 15 |
| K | 100 | 2 | 0.1 | B | 25 | 75 | 15 |
| L | 100 | 2 | 0.1 | C | 25 | 75 | 15 |
| M | 100 | 2 | 0.1 | D | 25 | 75 | 15 |

First impregnating compositions suitable for use in this invention are prepared as follows:

Each such first composition contains a first phenolic resole resin characterized by:

(1) Having a formaldehyde to phenol mol ratio of from about 0.9 to 2.5, (2) Being produced by reacting under aqueous liquid phase conditions phenol and formaldehyde in the presence of an organic basic catalyst, (3) Having a water solubility such that a 55 weight percent aqueous solution thereof can be prepared, and (4) Having a free formaldehyde content which is less than about 5 weight percent.

Example N

A water-soluble resole resin of phenol and formaldehyde is prepared as follows:

Phenol (100 parts), 50 percent Formalin (111 parts) and triethylamine (5 parts) are charged to a vessel. After reacting at 70° C. until the mixture's free formaldehyde content is less than 4 percent, the mixture is cooled. The resin product contains about 55 percent solids dissolved in water.

To make varnishes of this invention, one mixes the first and second resins as shown below:

Example 1

20 parts by weight of the first phenolic resin of Example N is added to 100 parts by weight of the second phenolic resin of Example F to produce a solution of the invention having a total resins solids content of about 58 percent by weight and a total dissolved water content of about 10 weight percent. The weight ratio of the first phenolic resin to the second phenolic resin is about 16 percent. Cotton linters paper is passed through the Example 1 varnish and the excess removed on scraper bars or between squeeze rolls. After proper drying in a circulating air oven, the treated paper has a resin content of 58 percent and a flow of 8 percent (amount of resin squeezed out; 6–2" discs, 1000 p.s.i., 150° C.). Eight plies of this treated paper are cured at 160° C. and 1000 p.s.i. pressure for 30 minutes. This 1/16" laminate has a combination of physical and electrical properties (water absorption by ASTM Test Method D–570–63, dielectric constant by ASTM Test Method D–150–59 dissipation factor by ASTM Test Method D–150–59, cold flow by ASTM Test Method D–621–44 and flexural strength by ASTM Test Method D–790–66) which makes the laminate suitable for use in electrical applications.

Examples 2–13

Each of the following indicated second phenolic resins (above described) is mixed with the first phenolic resin of Example N. 40 parts by acetone are added to each resulting mixture. The result is a varnish solution of the invention. Details are shown in Table VII below:

TABLE VII

| Example number | First resin Ex. No. | Parts by weight | Second resin Ex. No. | Parts by weight |
|---|---|---|---|---|
| 2 | N | 10 | A | 100 |
| 3 | N | 30 | B | 100 |
| 4 | N | 20 | C | 100 |
| 5 | N | 20 | D | 100 |
| 6 | N | 20 | E | 100 |
| 7 | N | 20 | G | 100 |
| 8 | N | 40 | H | 100 |
| 9 | N | 5 | I | 100 |
| 10 | N | 50 | J | 100 |
| 11 | N | 20 | K | 100 |
| 12 | N | 30 | L | 100 |
| 13 | N | 20 | M | 100 |

The product varnish in each example is suited for the manufacture of electrical grade laminates.

What is claimed is:

1. An organic solution adapted for use as a resole resin varnish in the manufacture of electrical grade paper laminates comprising:

(A) from about 20 to 75 weight percent, total solution basis, of a dissolved mixture of a first phenolic resin and a second phenolic resin, the weight ratio of said first phenolic resin to said second phenolic resin in said mixture ranging from about 1:2 to 1:20, dry mixture weight basis, (B) from about 0.5 to 15 weight percent, total solution basis, of dissolved water, (C) the balance up to 100 weight percent, total solution basis, of any given solution being an organic liquid which:
  (1) is substantially inert,
  (2) evaporates below about 150° C. at atmospheric pressures, and
  (3) is a mutual solvent for said mixture and for said water, (D) said first phenolic resin being a resole resin characterized by:
  (1) having a formaldehyde to phenol mol ratio of from about 0.9 to 2.5,
  (2) being produced by reacting under aqueous liquid phase conditions phenol and formaldehyde in the presence of an organic basic catalyst,
  (3) having a water solubility such that a 55 weight percent aqueous solution thereof can be prepared, and
  (4) having a free formaldehyde content which is less than about 5 weight percent, (E) said second phenolic resin being a resole resin characterized by:
  (1) having an aldehyde to, theoretical, phenol ratio of from about 0.8 to 2.0,
  (2) being produced by reacting under aqueous liquid phase conditions formaldehyde and a substituted phenol mixture in the presence of an organic basic catalyst,
  (3) being substantially insoluble in water but having a viscosity in methanol solution at 60 weight percent solids concentration of not greater than about 5000 centipoises, and
  (4) having a free formaldehyde content which is less than about 5 weight percent, (F) said substituted phenol mixture having been prepared by reacting phenol under Friedel-Crafts conditions with from about 35 to 80 parts by weight for each 100 parts by weight of said phenol of a mixture of cyclopentadiene codimers,
(G) said mixture of cyclopentadiene codimers comprising, when in a form substantially free of other materials wherein the sum of all component compounds of any given such mixture equals substantially 100 weight percent:
  (1) from about 50 to 99 weight percent of compounds each molecule of which has:
    (a) the dicyclopentadiene nucleus,
    (b) from 10 through 13 carbon atoms,
    (c) as nuclear substituents from 0 through 3 methyl groups, and
  (2) from about 1 to 50 weight percent of compounds each molecule of which is a codimer of cyclopentadiene with at least one acyclic conjugated alkadiene having from 4 through 6 carbon atoms per molecule.

2. The product of claim 1 wherein said cyclopentadiene codimer mixture comprises, same basis:
  (A) from about 70 to 90 weight percent of dicyclopentadiene,
  (B) from about 10 to 25 weight percent of compounds each molecule of which is a codimer of cyclopentadiene with at least one acyclic conjugated alkadiene having from 4 through 6 carbon atoms per molecule, and
  (C) from about 2.5 to 15 weight percent of compounds each molecule of which is a cyclic and/or an acyclic conjugated alkadiene having 5 or 6 carbon atoms per molecule.

3. The product of claim 1 wherein said cyclopentadiene codimer mixture comprises, same basis:
  (A) from about 1.5 to 10 weight percent of compounds each molecule of which has:
    (1) the indene nucleus,
    (2) from 9 through 13 carbon atoms,
    (3) as nuclear substituents from 0 through 4 methyl groups,
  (B) from about 50 to 70 weight percent of compounds each molecule of which has:
    (1) the dicyclopentadiene nucleus,
    (2) from about 10 through 13 carbon atoms,
    (3) as nuclear substituents from 0 through 3 methyl groups,
  (C) from about 4 to 10 weight percent of compounds each molecule of which is a codimer of cyclopentadiene with at least one acyclic conjugated alkadiene having from 4 through 6 carbon atoms per molecule, and
  (D) from about 4 to 10 weight percent of compounds each molecule of which has:
    (1) a phenyl group substituted by a vinylidene group,
    (2) from 8 through 13 carbon atoms,
    (3) as substituents from 0 through 3 groups selected from the class consisting of methyl and ethyl.

4. The product of claim 1 wherein said cyclopentadiene codimer mixture comprises, same basis:
  (A) from about 92 to 98 weight percent of dicyclopentadiene,
  (B) from about 1 to 5 weight percent of compounds each molecule of which is a codimer of cyclopentadiene with at least one acyclic conjugated alkadiene having from 4 through 6 carbon atoms per molecule, and
  (C) from about 1 to 4 weight percent of compounds each molecule of which is a codimer of cyclopentadiene with a methylcyclopentadiene, provided that the sum of (A) and (C) in any given such cyclopentadiene dimer mixture is always at least about 95 weight percent thereof, same basis.

5. The product of claim 1 wherein the weight percent of said dissolved mixture of first phenolic resin and second phenolic resin ranges from about 55 to 65 weight percent.

6. The product of claim 1 wherein the total weight percent of dissolved water ranges from about 6 through 12.

7. The product of claim 1 wherein the weight ratio of said first phenolic resin to said second phenolic resin ranges from about 1:4 to 1:8, dry mixture weight basis.

8. The product of claim 1 wherein the total organic liquid portion thereof, on a 100 weight percent basis when in a form substantially free of other materials, comprises:
  (A) from about 5 to 20 weight percent of a lower alkanone,
  (B) from about 2 to 20 weight percent of at least one aromatic hydrocarbon, and
  (C) the balance up to 100 weight percent, total organic liquid basis, of any given solution being a lower alkanol.

References Cited

UNITED STATES PATENTS

| | | | |
|---|---|---|---|
| 2,425,348 | 8/1947 | Schroeder | 260—845 |
| 3,287,440 | 11/1966 | Giller | 260—845 |
| 3,299,170 | 1/1967 | Gonzenbach | 260—845 |

FOREIGN PATENTS

| | | | |
|---|---|---|---|
| 657,886 | 2/1963 | Canada | 260—29.3 |

DONALD J. ARNOLD, Primary Examiner

U.S. Cl. X.R.

117—76 R, 155 L; 260—845, 846